(12) United States Patent
Sugiyama

(10) Patent No.: US 10,122,107 B2
(45) Date of Patent: Nov. 6, 2018

(54) CONNECTION DEVICE HAVING A RESIN MEMBER BETWEEN A RELAY TERMINAL AND A CONDUCTIVE TERMINAL

(71) Applicant: Yazaki Corporation, Tokyo (JP)

(72) Inventor: Fuminori Sugiyama, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/726,161

(22) Filed: Oct. 5, 2017

(65) Prior Publication Data

US 2018/0131114 A1    May 10, 2018

(30) Foreign Application Priority Data

Nov. 10, 2016  (JP) .................................. 2016-219388

(51) Int. Cl.
| | |
|---|---|
| H01R 13/24 | (2006.01) |
| H01R 13/05 | (2006.01) |
| B60R 16/03 | (2006.01) |
| H01R 13/10 | (2006.01) |
| H01R 13/14 | (2006.01) |
| H01R 13/187 | (2006.01) |
| B60L 15/00 | (2006.01) |

(52) U.S. Cl.
CPC ........... *H01R 13/052* (2013.01); *B60R 16/03* (2013.01); *H01R 13/10* (2013.01); *H01R 13/14* (2013.01); *H01R 13/187* (2013.01); *H01R 13/2414* (2013.01); *B60L 15/007* (2013.01); *B60Y 2410/115* (2013.01); *H01R 2201/26* (2013.01)

(58) Field of Classification Search
CPC . H01R 11/18; H01R 13/2421; H01R 13/2428
USPC .................................................. 439/700, 824
See application file for complete search history.

(56) References Cited

U.S. PATENT DOCUMENTS 2,644,145 A * 6/1953 Adams ............... H01R 13/2421
439/824
5,681,187 A * 10/1997 Fukushima .......... H01R 13/187
439/138

FOREIGN PATENT DOCUMENTS

JP          5012399 B2     8/2012

\* cited by examiner

*Primary Examiner* — Phuong Dinh
(74) *Attorney, Agent, or Firm* — Kenealy Vaidya LLP

(57) ABSTRACT

A connection device includes a conductive first counterpart terminal formed into a tubular shape with one side in a first direction open and the other side blocked, a conductive relay terminal provided inside the first counterpart terminal, an interposition member provided inside the first counterpart terminal, and interposed between the first counterpart terminal and the relay terminal with respect to intersection directions, an elastic member provided inside the first counterpart terminal, interposed between a blocked end portion that is an end portion on the blocked side of the first counterpart terminal and the relay terminal 31 with respect to the first direction, and elastically deformable along the first direction, and a second counterpart terminal that is a conductive terminal different from the first counterpart terminal and coming in contact with an end portion on an opposite side of the elastic member side of the relay terminal.

4 Claims, 5 Drawing Sheets

CONNECTION DEVICE HAVING A RESIN MEMBER BETWEEN A RELAY TERMINAL AND A CONDUCTIVE TERMINAL

CROSS-REFERENCE TO RELATED APPLICATION(S)

The present application claims priority to and incorporates by reference the entire contents of Japanese Patent Application No. 2016-219388 filed in Japan on Nov. 10, 2016.

BACKGROUND OF THE INVENTION

1. Field of the Invention

The present invention relates to a connection device.

2. Description of the Related Art

As a conventional connection device applied to a vehicle or the like, Japanese Patent No. 5012399 discloses a high-voltage cable connection device for vehicle driving electric power that includes a male connector and a female connector, for example. The male connector includes an insulating tubular portion, and a first terminal provided on a bottom portion of the tubular portion and to which a first cable is connected. The female connector includes a hole having an opening portion with an inner diameter larger than an outer diameter of the tubular portion of the male connector, and a second terminal provided on a bottom portion of the hole and to which a second cable is connected. This connection device further includes a conductive spring inserted into the tubular portion in an unfixed structure to both the first and second terminals. The conductive spring comes in contact with the first and second terminals and is compressed, and electrically connects the first and second terminals, when the tubular portion of the male connector is fitted into the hole of the female connector, and the fame and female connectors are connected.

By the way, the vehicle drive power high-voltage cable connection device described in Japanese Patent No. 5012399 has room for further improvement in stabilization of a point of contact between terminals.

SUMMARY OF THE INVENTION

The present invention has been made in view of the foregoing, and an objective is to provide a connection device that can stabilize a point of contact.

In order to achieve the above mentioned object, a connection device according to one aspect of the present invention includes a conductive first counterpart terminal formed into a tubular shape, one side of the first counterpart terminal in a first direction being opened and the other side thereof being blocked; a conductive relay terminal provided inside the first counterpart terminal and formed extending along the first direction; a conductive interposition member provided inside the first counterpart terminal, interposed between the first counterpart terminal and the relay terminal with respect to an intersection direction intersecting with the first direction, and being in contact with the first counterpart terminal and the relay terminal; an elastic member provided inside the first counterpart terminal, interposed between the relay terminal and a blocked end portion that is an end portion on the blocked side of the first counterpart terminal with respect to the first direction, and elastically deformable along the first direction; and a second counterpart terminal that is a conductive terminal different from the first counterpart terminal, and coming in contact with an end portion on an opposite side of a side of the elastic member of the relay terminal with respect to the first direction.

According to another aspect of the present invention, in the connection device, it is possible to configure that the elastic member includes a resin member to be filled between the blocked end portion and the relay terminal.

According to still another aspect of the present invention, in the connection device, it is possible to configure that at least one of the relay terminal and the second counterpart terminal includes a connection surface planarly formed along the intersection direction intersecting with the first direction, and coming in contact with the other of the relay terminal or the second counterpart terminal.

According to still another aspect of the present invention, in the connection device, it is possible to configure that the first counterpart terminal configures a first connector to be provided in a first device, and the second counterpart terminal configures a second connector to be provided in a second device different from the first device.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 4:
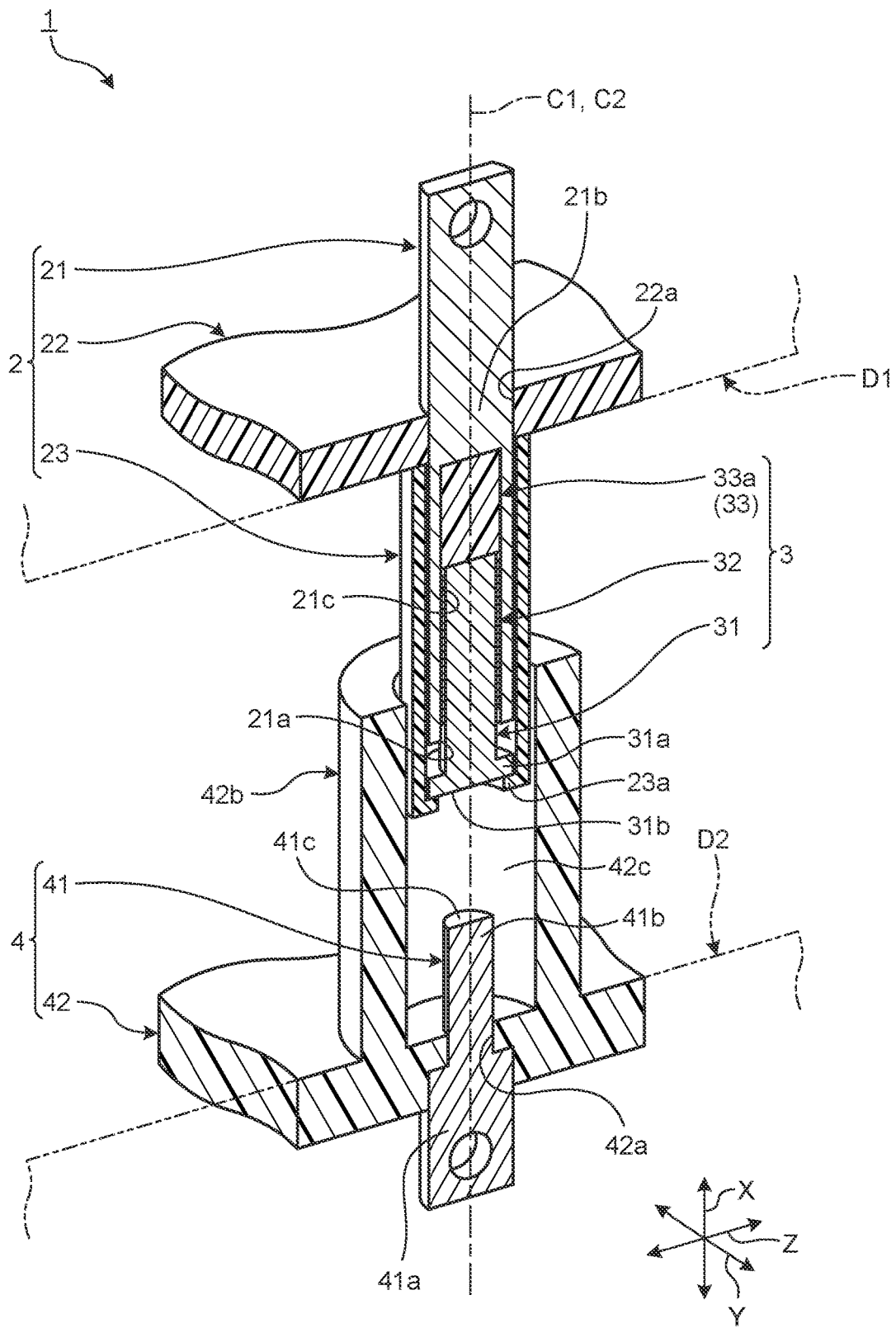
FIG. 4 is a partial sectional perspective view illustrating a state before the first connector and the second connector of the connection device according to the embodiment are fitted to each other.
Figure 5:
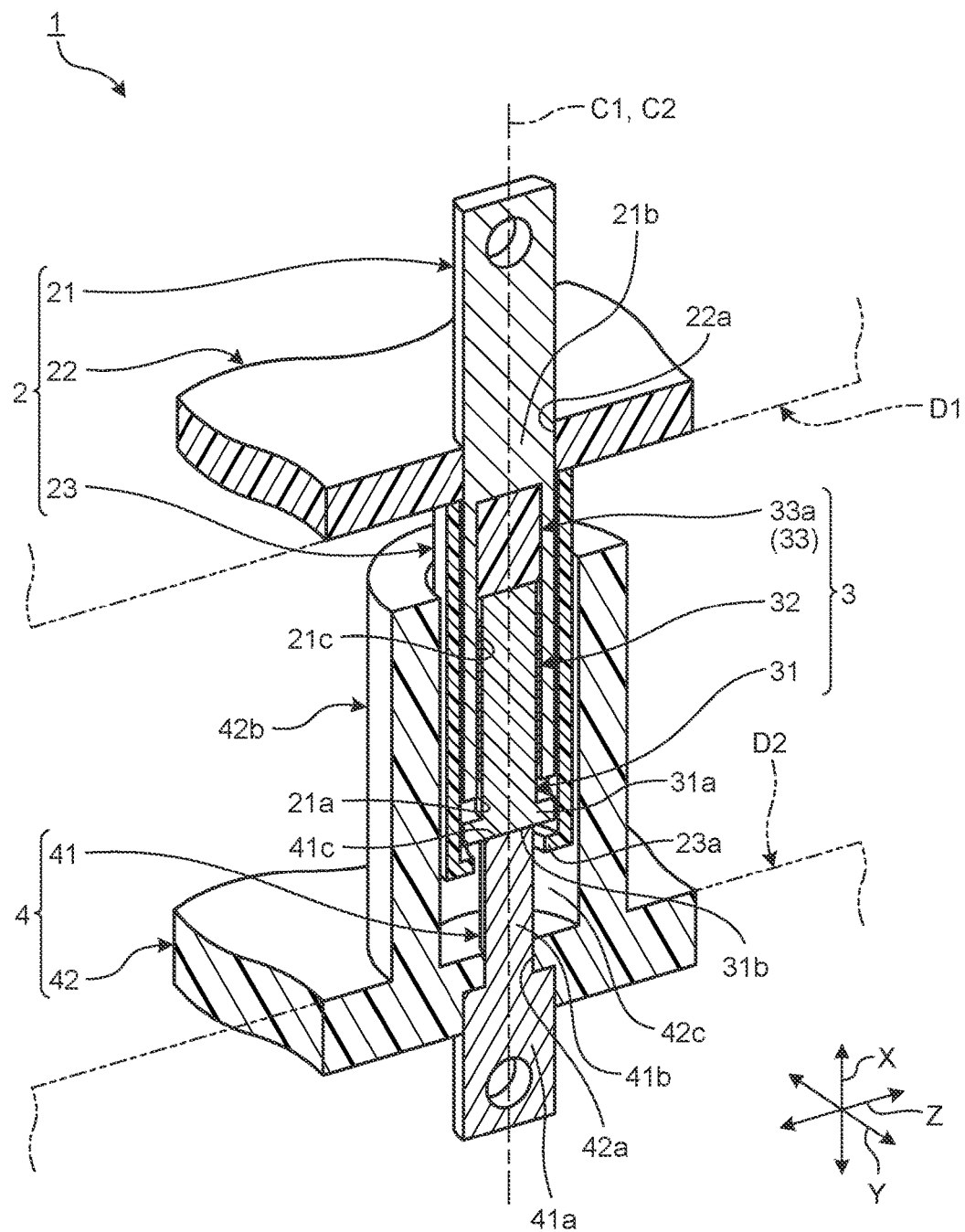
FIG. 5 is a partial sectional perspective view illustrating a state before the first connector and the second connector of the connection device according to the embodiment are fitted to each other.

Hereinafter, an embodiment according to the present invention will be described in detail on the basis of the drawings. Note that the present invention is not limited by the embodiment. Further, configuration elements in the embodiment below include elements replaceable by and easy for a person skilled in the art, and substantially the same elements. Each of the drawings illustrates only a part of each housing. Further, FIGS. 4 and 5 illustrate only a part of a first device and a second device by alternate long and two short dashes line in an omitted manner.

Embodiment

Figure 1:
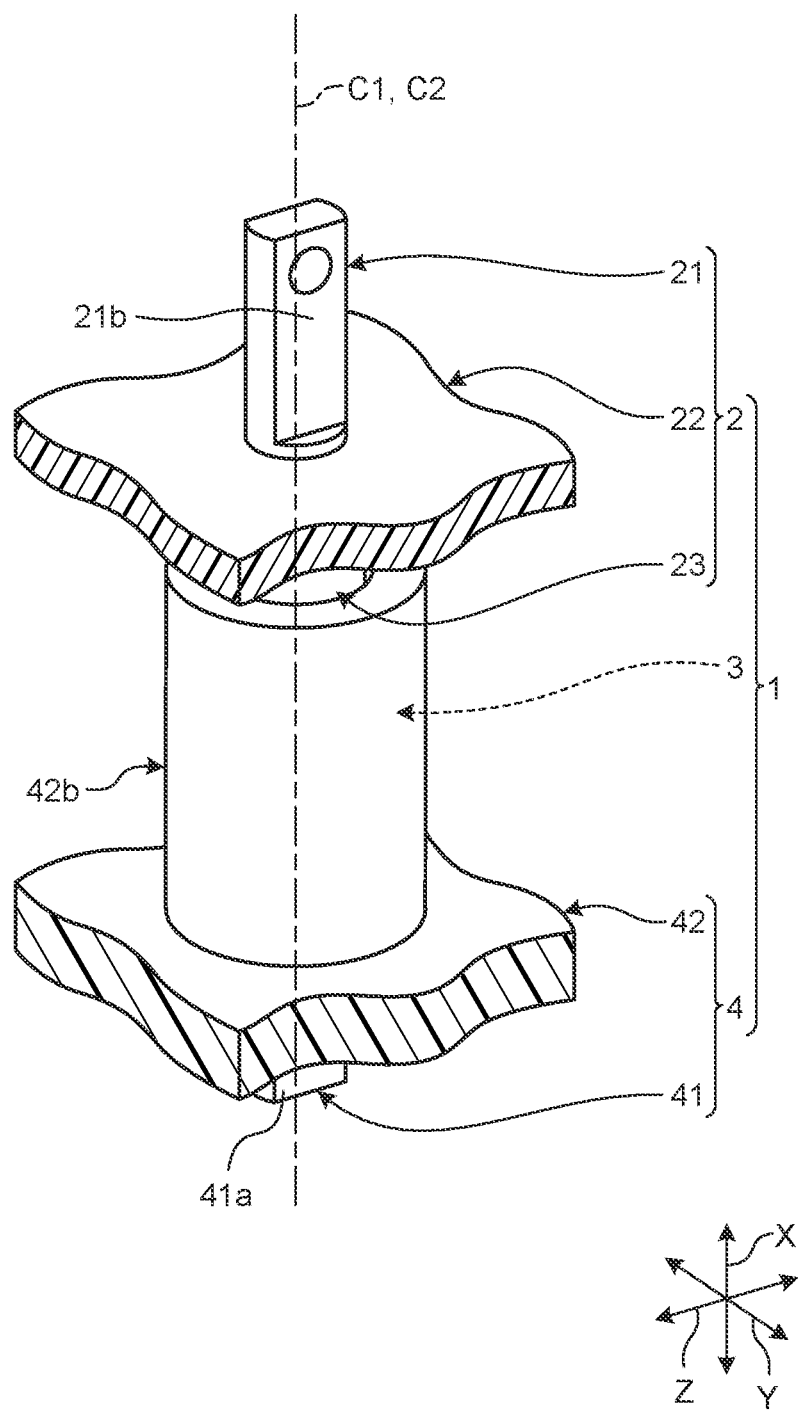
FIG. 1 is a partial perspective view illustrating a schematic configuration of a connection device according to an embodiment.
Figure 2:
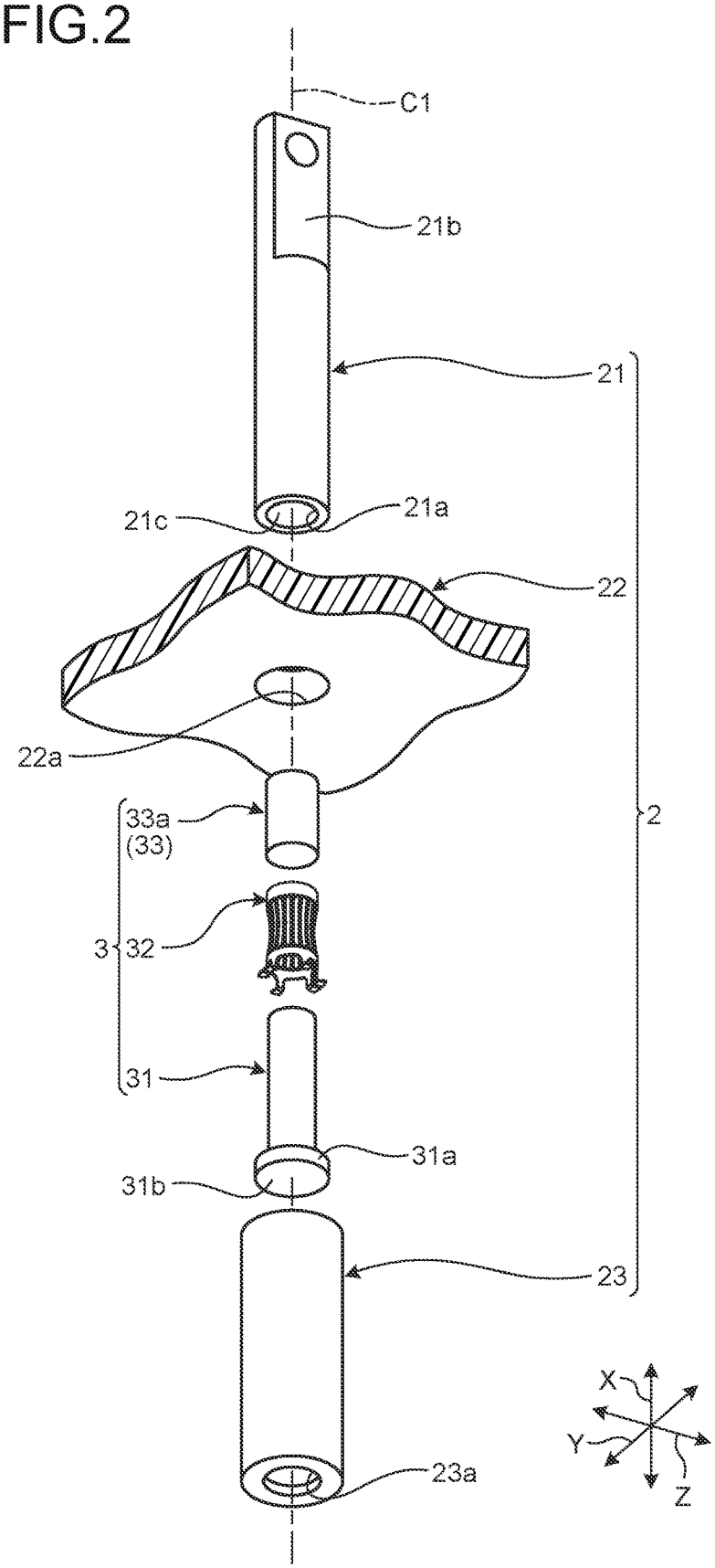
FIG. 2 is a partial exploded perspective view illustrating a schematic configuration of a first connector included in the connection device according to the embodiment.
Figure 3:
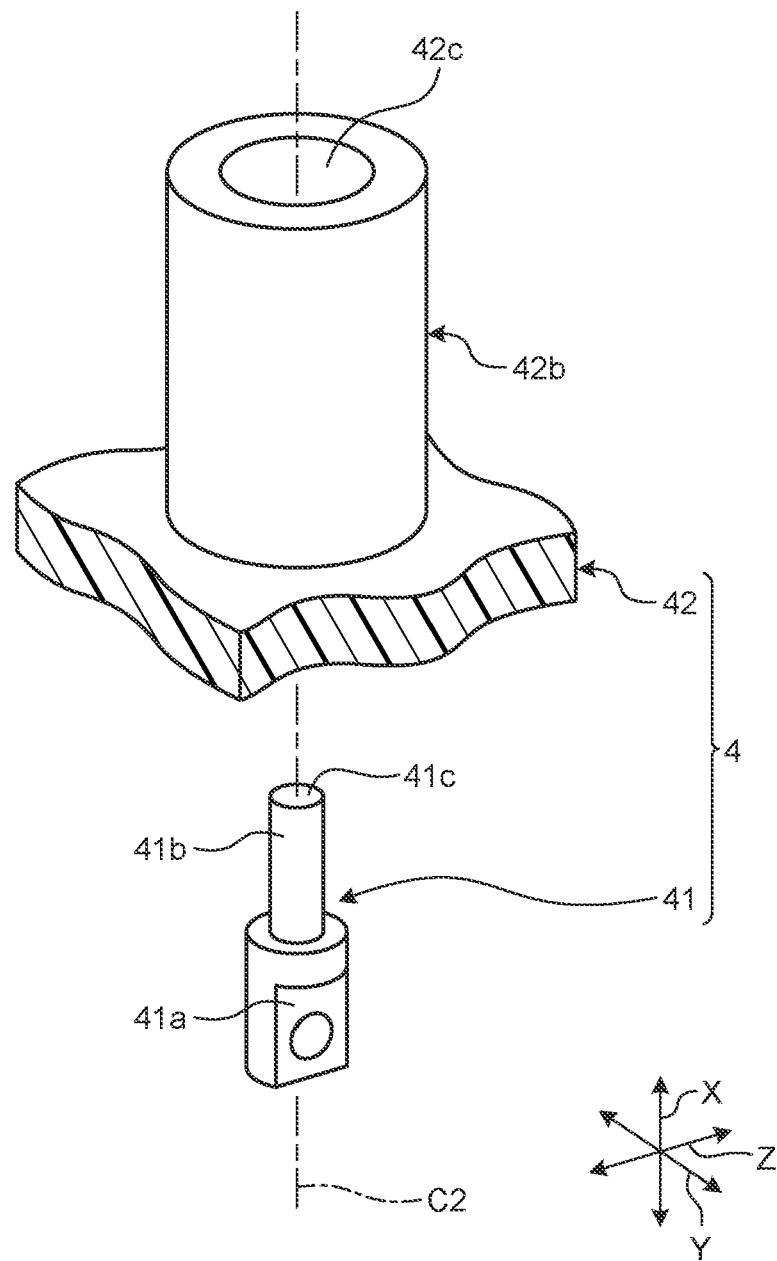
FIG. 3 is a partial exploded perspective view illustrating a schematic configuration of a second connector included in the connection device according to the embodiment.

A connection device 1 according to the present embodiment illustrated in FIGS. 1 to 3 includes a first connector 2, a relay unit 3, and a second connector 4. The connection device 1 electrically connects the first connector 2 and the second connector 4 through the relay unit 3 to achieve stabilization of a point of contact between terminals. In the connection device 1 of the present embodiment, the first connector 2 is provided in a first device D1 (see FIGS. 4 and 5), and the second connector 4 is provided in a second device D2 (see FIGS. 4 and 5) different from the first device D1. The first connector 2 and the second connector 4 may just be assembled to the first device D1 and the second device D2 by various techniques. Then, in the connection device 1, the first connector 2 and the second connector 4 are fitted to each other, interposing the relay unit 3, to form an electrical connection portion between the first connector 2 and the second connector 4. With the configuration, the connection device 1 of the present embodiment electrically connects the first device D1 and the second device D2 through the first connector 2, the relay unit 3, and the second connector 4, to configure a device-to-device connection device that enables power supply and signal communication between the first device D1 and the second device D2.

The first device D1 and the second device D2 to which the connection device 1 according to the present embodiment is applied are mounted on a vehicle, for example. Here, the description will be given, using an example in which the first device D1 is an inverter mounted on a vehicle such as a hybrid car or an electric car, and the second device D2 is a motor mounted on the vehicle. The first device D1 as an inverter is a conversion device that converts a direct-current output from a power source mounted on the vehicle into a three-phase alternating-current output. The second device D2 as a motor is a device that is driven by the three-phase alternating-current output by the first device D1 as an inverter to generate power for traveling of the vehicle, and is, for example, a Y-connection three-phase motor. The first connector 2 configures an inverter-direct mount connector (INV connector) that is directly mounted on the first device D1 as an inverter, and the second connector 4 configures a motor-direct mount connector (MOT connector) that is directly mounted on the second device D2 as a motor. The connection device 1 then can transfer relatively high-voltage three-phase alternating-current power between the first device D1 and the second device D2 through the first connector 2, the relay unit 3, and the second connector 4. Hereinafter, configurations of the connection device 1 will be described in detail with reference to the drawings.

Note that, in the description below, three connection devices 1 are provided for three phases corresponding to the three-phase alternating-current power. However, since the three connection devices 1 have a nearly equal configuration, the drawings illustrate one of the three connection devices 1, and description common to the three connection devices 1 will be given. Further, in the description below, among first, second, and third directions intersecting with one another, the first direction is referred to as "axial direction X", the second direction is referred to as "first width direction Y", and the third direction is referred to as "second width direction Z". Here, the axial direction X, the first width direction Y, and the second width direction Z are perpendicular to one another. The axial direction X typically corresponds to an extending direction of a first counterpart terminal 21 and a second counterpart terminal 41 described below. In other words, the axial direction X corresponds to a direction along a fitting direction of the first connector 2 and the second connector 4. Further, the first width direction Y and the second width direction Z correspond to intersection directions intersecting with the axial direction X. Directions used in the description below represent directions in a state where portions of the connection device 1 are assembled with one another unless otherwise especially noted.

To be specific, the first connector 2 includes the first counterpart terminal 21, a first housing 22, and a front holder 23. The first counterpart terminal 21 is provided in the first housing 22 along the axial direction X.

The first counterpart terminal 21 is a metal fitting formed into a tubular shape with a conductive metal material, and configures the first connector 2 to be provided in the first device D1. Here, the first counterpart terminal 21 is formed into an approximately cylindrical shape around a central axis line C1 along the axial direction X, and is formed to extend along the axial direction X. The first counterpart terminal 21 has one side in the axial direction X open and the other side blocked. That is, in the first counterpart terminal 21, an opening portion 21a that is an end portion open to one side is formed in the one side in the axial direction X, and a blocked end portion 21b that is a blocked end portion is formed in the other side in the axial direction X (see FIGS. 4 and 5). Further, in the first counterpart terminal 21, a space portion on an inner peripheral surface side configures an accommodation space portion 21c that accommodates the relay unit 3. The opening portion 21a allows one side in the axial direction X, of the accommodation space portion 21c, to open and makes the relay unit 3 insertable into the accommodation space portion 21c. The blocked end portion 21b blocks the other side in the axial direction X, of the accommodation space portion 21c, and is electrically connected with a configuration element of the first device D1 as an inverter.

The first housing 22 is provided with the first counterpart terminal 21 along the axial direction X, and accommodates and holds the first counterpart terminal 21. The first housing 22 is configured from an insulating resin material. In the first housing 22, a terminal insertion hole 22a into which the first counterpart terminal 21 is inserted and which holds the first counterpart terminal 21 is formed. The terminal insertion hole 22a is formed to extend along the axial direction X, and may be called cavity. The terminal insertion hole 22a is a space portion that allows the first counterpart terminal 21 to be insertable along the axial direction X, and holds the first counterpart terminal 21. The terminal insertion hole 22a holds the first counterpart terminal 21 in a positional relationship in which the central axis line C1 goes along the axial direction X.

The front holder 23 covers an outer surface of the first counterpart terminal 21 in a held state in the first housing 22, and positions the relay unit 3 with respect to the axial direction X. The front holder 23 is formed into a tubular shape with an insulating resin material. Here, the front holder 23 is formed into an approximately cylindrical shape around the central axis line C1 along the axial direction X, and is formed to extend along the axial direction X. The front holder 23 is formed into an external shape fittable to a hood portion 42b of the second connector 4. The front holder 23 has both sides in the axial direction X open. The front holder 23 has a flange portion 23a formed in end portion on one side in the axial direction X (see FIGS. 4 and 5). The flange portion 23a is formed into an approximately annular disk shape around the central axis line C1. The flange portion 23a is formed to protrude to an inner peripheral surface side of the front holder 23. The front holder 23 is mounted in the first housing 22 after the first counterpart terminal 21 is held in the first housing 22, and the relay unit 3 describe below is assembled in the accommodation space portion 21c. In the front holder 23, an end portion on an opposite side of the flange portion 23a is positioned on the first housing 22 side, and the front holder 23 is mounted to the first housing 22 in a positional relationship in which the first counterpart terminal 21 is inserted inside and the front holder 23 covers an outer peripheral surface of the first counterpart terminal 21. The front holder 23 is locked with the first housing 22 through a locking portion such as a locking claw and mounted to the first housing 22.

The relay unit 3 includes a relay terminal 31, an interposition member 32, and an elastic member 33, and relays electrical connection with the first connector 2 and the second connector 4 through the relay terminal 31 and the interposition member 32. The relay unit 3 is provided in the accommodation space portion 21c inside the first counterpart terminal 21.

The relay terminal 31 is a metal fitting formed into a columnar shape with a conductive metal material. Here, the relay terminal 31 is formed into an approximately tubular shape around the central axis line C1 along the axial direction X, and is formed to extend along the axial direction X. In the relay terminal 31, a connection end portion 31a is formed in an end portion on one side in the axial direction X. The connection end portion 31a is formed into an approximately annular disk shape around the central axis line C1. The connection end portion 31a is formed into an approximately annular disk shape having a larger diameter than the other portion in the relay terminal 31. The relay terminal 31 includes a planarly formed connection surface 31b along the first width direction Y and the second width direction Z that are intersection directions perpendicular to (intersecting with) the axial direction X, and coming in contact with the second counterpart terminal 41. The connection surface 31b is configured from a one-side surface in the axial direction X, of the connection end portion 31a. The relay terminal 31 is inserted into and provided in the accommodation space portion 21c inside the first counterpart terminal 21. The relay terminal 31 is inserted into the accommodation space portion 21c in a positional relationship in which the connection end portion 31a is exposed through the opening portion 21a to one side in the axial direction X. The relay terminal 31 is relatively movably held in the accommodation space portion 21c along the axial direction X. The relay terminal 31 forms a point of contact that is an electrical connection portion with the second counterpart terminal 41 as the second counterpart terminal 41 comes in contact with the connection surface 31b of the connection end portion 31a exposed through the opening portion 21a. In a state where the relay terminal 31 is inserted into the accommodation space portion 21c, the interposition member 32 and the elastic member 33 described next are interposed between the relay terminal 31 and the first counterpart terminal 21.

The interposition member 32 is a metal fitting formed into a plate shape with a conductive metal material. The interposition member 32 is provided in the accommodation space portion 21c inside the first counterpart terminal 21 in a positional relationship in which the interposition member 32 is interposed between the first counterpart terminal 21 and the relay terminal 31 with respect to the first width direction Y and the second width direction Z. The interposition member 32 is formed into an approximately cylindrical shape curved along an inner peripheral surface of the first counterpart terminal 21 and an outer peripheral surface of the relay terminal 31 in a manner capable of being interposed between the first counterpart terminal 21 and the relay terminal 31. The interposition member 32 has a plurality of slits formed along the axial direction X, and configures a plate spring elastically deformable along the first width direction Y and the second width direction Z. The interposition member 32 is provided inside the accommodation space portion 21c in such a manner that one portion is hooked on an end surface on the opening portion 21a side of the first counterpart terminal 21. Here, the interposition member 32 is provided throughout the entire periphery of the relay terminal 31 in a positional relationship in which the relay terminal 31 is inserted into the interposition member 32. The interposition member 32 is in contact with the first counterpart terminal 21 and the relay terminal 31 in a state where the interposition member 32 is interposed between the first counterpart terminal 21 and the relay terminal 31. The interposition member 32 comes in contact with the inner peripheral surface of the first counterpart terminal 21 to form a point of contact that is an electrical connection portion with the first counterpart terminal 21. Further, the interposition member 32 comes in contact with the outer peripheral surface of the relay terminal 31 to form a point of contact that is an electrical connection portion with the relay terminal 31.

The elastic member 33 is an elastic body provided in the accommodation space portion 21c inside the first counterpart terminal 21, interposed between the blocked end portion 21b of the first counterpart terminal 21 and the relay terminal 31 with respect to the axial direction X, and elastically deformable along the axial direction X. The elastic member 33 functions as a contact pressure securing member for securing a contact pressure along the axial direction X at the point of contact formed between the relay terminal 31 and the second counterpart terminal 41. The elastic member 33 of the present embodiment includes a resin member 33a to be filled between the blocked end portion 21b and the relay terminal 31 as an elastic body. The resin member 33a is formed of an insulating elastic resin material such as rubber or elastomer. Here, the resin member 33a is filled between the blocked end portion 21b and the relay terminal 31 without a gap, and is formed into an approximately columnar shape, for example.

The relay unit 3 configured as described above is assembled in such a manner that the resin member 33a that configures the elastic member 33 is filled to the blocked end portion 21b side in the accommodation space portion 21c in the first counterpart terminal 21, and then the relay terminal 31 and the interposition member 32 mounted on the outer peripheral surface of the relay terminal 31 are inserted into the accommodation space portion 21c. The relay unit 3 has the connection end portion 31a of the relay terminal 31 positioned between the end surface on the opening portion 21a side of the first counterpart terminal 21 and the flange portion 23a of the front holder 23 with respect to the axial direction X as the front holder 23 is mounted in the first housing 22. With the configuration, in the relay unit 3, the connection end portion 31a of the relay terminal 31 comes in contact with the flange portion 23a of the front holder 23, and thus falling of the relay terminal 31 from the first connector 2 is restricted and the relay terminal 31 is positioned with respect to the axial direction X. The relay terminal 31 is relatively movably held between the end surface on the opening portion 21a side of the first counterpart terminal 21 and the flange portion 23a of the front holder 23 in the accommodation space portion 21c along the axial direction X. The relay terminal 31 is slidable along the axial direction X in a state of having the interposition member 32 interposed between the relay terminal 31 and the inner peripheral surface of the first counterpart terminal 21, and maintaining the electrical connection with the first counterpart terminal 21 through the interposition member 32.

The second connector 4 includes the second counterpart terminal 41 and a second housing 42. The second counterpart terminal 41 is provided in the second housing 42 along the axial direction X.

The second counterpart terminal 41 is a metal fitting formed into a columnar shape with a conductive metal material, and configures the second connector 4 to be provided in the second device D2. The second counterpart terminal 41 is a conductive terminal different from the first counterpart terminal 21. Here, the second counterpart terminal 41 is formed into an approximately cylindrical shape around a central axis line C2 along the axial direction X, and is formed to extend along the axial direction X. The second counterpart terminal 41 has a connection end portion 41a formed on one side in the axial direction X and a connection end portion 41b on the other side in the axial direction X (also see FIGS. 4 and 5). The connection end portion 41a is electrically connected with a configuration element of the second device D2 as a motor. The connection end portion 41b is formed into an approximately columnar shape around the central axis line C2. The connection end portion 41b is formed into the approximately columnar shape having a smaller diameter than the connection end portion 41a and having a smaller diameter than the inner diameter of the flange portion 23a. The second counterpart terminal 41 includes a planarly formed connection surface 41c along the first width direction Y and the second width direction Z that are intersection directions perpendicular to (intersecting with) the axial direction X, and coming in contact with the connection surface 31b of the relay terminal 31. The connection surface 41c is configured from a surface facing the connection surface 31b of the relay terminal 31 with respect to the axial direction X, in the connection end portion 41b, in other words, an end surface on an opposite side of the connection end portion 41a. In the second counterpart terminal 41, the connection surface 31b of the connection end portion 31a of the relay terminal 31 comes in contact with the connection surface 41c of the connection end portion 41b. That is, the second counterpart terminal 41 comes in contact with the end portion on the opposite side of the elastic member 33 side of the relay terminal 31 with respect to the axial direction X. With the configuration, the second counterpart terminal 41 forms a point of contact that is an electrical connection portion with the relay terminal 31.

The second housing 42 is provided with the second counterpart terminal 41 along the axial direction X, and accommodates and holds the second counterpart terminal 41. The second housing 42 is configured from an insulating resin material. In the second housing 42, a terminal insertion hole 42a into which the second counterpart terminal 41 is inserted and which holds the second counterpart terminal 41 is formed (see FIGS. 4 and 5). The terminal insertion hole 42a is formed to extend along the axial direction X, and may be called cavity. The terminal insertion hole 42a is a space portion that allows the second counterpart terminal 41 to be insertable along the axial direction X, and holds the second counterpart terminal 41. The terminal insertion hole 42a holds the second counterpart terminal 41 in a positional relationship in which the central axis line C2 goes along the axial direction X. Further, in the second housing 42, a hood portion 42b to which the front holder 23 is fittable is formed. The hood portion 42b is formed into an approximately cylindrical shape around the central axis line C2 and is formed to extend along the axial direction X. A space portion on an inner peripheral surface side of the hood portion 42b configures a fitting space portion 42c. The second counterpart terminal 41 is held in the second housing 42 in a positional relationship in which the connection end portion 41b is exposed to the fitting space portion 42c, in a state where the second counterpart terminal 41 is held in the terminal insertion hole 42a. The fitting space portion 42c is a space portion to which the front holder 23 is fitted, and is formed into a space portion having a size and a shape to which the front holder 23 is fittable according to an external shape of the front holder 23.

In the connection device 1 configured as described above, the central axis line C1 and the central axis line C2 roughly accord with each other, and the first connector 2 and the second connector 4 are fitted to each other along the axial direction X together with the first device D1 and the second device D2 in a positional relationship in which the front holder 23 is inserted into the fitting space portion 42c inside the hood portion 42b, as illustrated in FIG. 4. Then, in the connection device 1, the first connector 2 and the second connector 4 are pushed into an approaching direction along the axial direction X together with the first device D1 and the second device D2, the connection end portion 41b of the second counterpart terminal 41 enters the inside of the front holder 23 through an inner side of the flange portion 23a, as illustrated in FIG. 5. With the movement, in the connection device 1, the connection surface 41c of the connection end portion 41b comes in contact with the connection surface 31b of the connection end portion 31a of the relay terminal 31, and a point of contact is formed. Further, in the connection device 1, a point of contact is formed between the first counterpart terminal 21 and the interposition member 32 as the inner peripheral surface of the first counterpart terminal 21 and the interposition member 32 come in contact with each other, and a point of contact is formed between the interposition member 32 and the relay terminal 31 as the interposition member 32 and the outer peripheral surface of the relay terminal 31 come in contact with each other. Therefore, with the configuration, the connection device 1 can electrically connect the first counterpart terminal 21 and the second counterpart terminal 41 through the interposition member 32 and the relay terminal 31 accommodated inside the first counterpart terminal 21. Then, in the connection device 1, the second housing 42 and the front holder 23 are locked through a locking portion such as a locking claw, in a state where the front holder 23 is fitted to the fitting space portion 42c of the hood portion 42b, and the second counterpart terminal 41 and the relay terminal 31 are appropriately connected through the connection surface 41c and the connection surface 31b, whereby, the fitted state is maintained.

The above-described connection device 1 can electrically connect the first counterpart terminal 21 and the second counterpart terminal 41 through the interposition member 32 and the relay terminal 31 accommodated inside the first counterpart terminal 21. At this time, the connection device 1 can absorb tolerance along the first width direction Y and the second width direction Z by the interposition member 32 that configures so-called a plate spring, and also can maintain the state in which the first counterpart terminal 21 and the relay terminal 31 are electrically connected even if the first counterpart terminal 21 and the relay terminal 31 are relatively moved along the axial direction X. Here, the connection device 1 can have a multi-point of contact structure because the interposition member 32 is interposed between the first counterpart terminal 21 and the relay terminal 31, and thus can secure stable points of contact.

Then, in the state, the connection device 1 can absorb tolerance along the axial direction X by the elastic member 33 interposed between the blocked end portion 21b of the first counterpart terminal 21 and the relay terminal 31, and can sufficiently secure a contact pressure of the point of connection between the relay terminal 31 and the second counterpart terminal 41. That is, in the connection device 1, the relay terminal 31 is slid to be pushed along the axial direction X in a state where the relay terminal 31 has the interposition member 32 interposed between the relay terminal 31 and the first counterpart terminal 21, with pushing of the first connector 2 and the second connector 4 in an approaching direction along the axial direction X. The connection device 1 then can absorb assembly tolerance along the axial direction X by the elastic member 33 as the elastic member 33 is pushed and elastically deformed along the axial direction X between the blocked end portion 21b of the first counterpart terminal 21 and the relay terminal 31, with the relative sliding of the relay terminal 31 and the first counterpart terminal 21. The connection device 1 then can sufficiently secure the contact pressure along the axial direction X at the point of contact formed between the relay terminal 31 and the second counterpart terminal 41, as the relay terminal 31 is pressed toward the second counterpart terminal 41 along the axial direction X by restoration force of the elastically deformed elastic member 33. In other words, the elastic member 33 is formed to have a size that can apply sufficient contact pressure in the axial direction X to the point of contact between the relay terminal 31 and the second counterpart terminal 41 by the restoration force of the elastically deformed elastic member 33, in a state where the front holder 23 is fitted in the fitting space portion 42c of the hood portion 42b, and the second counterpart terminal 41 and the relay terminal 31 are appropriately connected through the connection surface 41c and the connection surface 31b. With the configuration, the connection device 1 can reliably secure the contact pressure, which is necessary for electrical connection between the relay terminal 31 and the second counterpart terminal 41, and can stabilize the point of contact. Here, the connection device 1 transfers relatively high-voltage power through the relay terminal 31 and the like between the first counterpart terminal 21 and the second counterpart terminal 41. Therefore, in the present configuration that requires more reliable point of contact formation, the connection device 1 can reliably secure the contact pressure of the point of contact as described above, and thus can improve reliability of the point of contact in the high-voltage system.

Further, in the connection device 1, the relay terminal 31, the interposition member 32, and the elastic member 33 as a contact pressure securing member, which configure the relay unit 3, are arranged to be accommodated in the accommodation space portion 21c inside the first counterpart terminal 21. Therefore, an increase in the external shape can be suppressed. That is, the connection device 1 can stabilize the point of contact after suppressing an increase in the size.

Here, in the above-described connection device 1, the elastic member 33 includes the resin member 33a to be filled between the blocked end portion 21b and the relay terminal 31. With the configuration, the connection device 1 can easily adjust the balance between a tolerance absorption amount along the axial direction X by the elastic member 33 and the magnitude of the contact pressure along the axial direction X at the point of contact between the relay terminal 31 and the second counterpart terminal 41, by adjusting a filling amount of the resin member 33a. Therefore, the connection device 1 can decrease a work load in design/manufacturing and can suppress the manufacturing cost, for example.

Further, in the above-described connection device 1, at least one of the relay terminal 31 and the second counterpart terminal 41, here, both of the relay terminal 31 and the second counterpart terminal 41 has the planar connection surfaces 31b and 41c. Therefore, the point of contact between the relay terminal 31 and the second counterpart terminal 41 can be formed at a position on either one of the connection surfaces 31b and 41c. With the configuration, the connection device 1 can allow deviation of the point of contact position between the relay terminal 31 and the second counterpart terminal 41 within the ranges of the planar connection surfaces 31b and 41c. Therefore, the connection device 1 can absorb assembly tolerance along the first width direction Y and the second width direction Z, and can also stabilize the point of contact in this regard.

Further, in the above-described connection device 1, the first counterpart terminal 21 configures the first connector 2 to be provided in the first device D1 and the second counterpart terminal 41 configures the second connector 4 to be provided in the second device D2. Therefore, the connection device 1 can absorb assembly tolerance by the above-described structure, in the device-to-device connection device in which assembly tolerance between the first device D1 and the second device D2 is relatively readily caused. With the configuration, the connection device 1 enables easy assembly of the first device D1 and the second device D2, and can then realize a stable point of contact structure. Further, with the configuration, the connection device 1 can absorb assembly tolerance without including an aligning structure between the first counterpart terminal 21 of the first device D1 and the second counterpart terminal 41 of the second device D2, for example. Therefore, the connection device 1 enables insert molding of the first connector 2, the relay unit 3, and the second connector 4 together with housings of the first device D1 and the second device D2, for example. Therefore, the connection device 1 can suppress the number of assembly parts in the assembled state of the first device D1 and the second device D2, and for example, can decrease the work load in manufacturing and can suppress the manufacturing cost.

Note that the above-described connection device according to the embodiment of the present invention is not limited to the above-described embodiment, and various modifications can be made within the scope described in claims.

The first device D1 and the second device D2 to which the above-described connection device 1 is applied are mounted on a vehicle, for example. Here, the description has been made, using an example in which the first device D1 is an inverter and the second device D2 is a motor. However, an embodiment is not limited to the example. For example, the first device D1 and the second device D2 may be mounted on something other than a vehicle, or may be applied to something other than an inverter and a motor on a vehicle.

The above-described connection device 1 has been described to configure a device-to-device connection device. However, an embodiment is not limited to the configuration, and the connection device 1 may configure a wire-to-device connection device or a wire-to-wire connection device.

The above-described first counterpart terminal 21 is formed into the approximately tubular shape around the central axis line C1 along the axial direction X. However, the shape is not limited thereto, and may be an approximately square cylindrical shape as long as the shape is a tubular shape. In this case, the relay terminal 31 and the like may just be formed into shapes according to the shape of the first counterpart terminal 21.

The description has been made, where the relay terminal 31 and the second counterpart terminal 41 described above respectively include the planarly formed connection surfaces 31b and 41c. However, the embodiment is not limited thereto. One of the relay terminal 31 and the second counterpart terminal 41 may include the planarly formed connection surface, or both the relay terminal 31 and the second counterpart terminal 41 may include the connection surfaces 31b and 41c.

The description has been given, where the elastic member 33 described above includes the resin member 33a as an elastic body. However, the embodiment is not limited to the configuration. The elastic member 33 may include a conductive metal spring, and the like, for example.

The connection device according to the present embodiment can electrically connect the first counterpart terminal and the second counterpart terminal through the interposition member and the relay terminal accommodated inside the first counterpart terminal. At this time, the connection device can maintain a state in which the first counterpart terminal and the relay terminal are electrically connected by the interposition member interposed between the first counterpart terminal and the relay terminal even if the first counterpart terminal and the relay terminal are relatively moved along the first direction. Then, in the state, the connection device can sufficiently secure a contact pressure (contact load) of the point of connection between the relay terminal and the second counterpart terminal by the elastic member interposed between the blocked end portion of the first counterpart terminal and the relay terminal. With the configuration, the connection device exhibits an effect to stabilize the point of contact.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A connection device comprising:
a conductive first counterpart terminal formed into a tubular shape, one side of the first counterpart terminal in a first direction being opened and the other side thereof being blocked;
a conductive relay terminal provided inside the first counterpart terminal and formed extending along the first direction;
a conductive interposition member provided inside the first counterpart terminal, interposed between the first counterpart terminal and the relay terminal with respect to an intersection direction intersecting with the first direction, and being in contact with the first counterpart terminal and the relay terminal;
an elastic member provided inside the first counterpart terminal, interposed between the relay terminal and a blocked end portion that is an end portion on the blocked side of the first counterpart terminal with respect to the first direction, and elastically deformable along the first direction; and
a second counterpart terminal that is a conductive terminal different from the first counterpart terminal, and coming in contact with an end portion on an opposite side of a side of the elastic member of the relay terminal with respect to the first direction, wherein
the elastic member includes a resin member to be filled between the blocked end portion and the relay terminal.

2. The connection device according to claim 1, wherein at least one of the relay terminal and the second counterpart terminal includes a connection surface planarly formed along the intersection direction intersecting with the first direction, and coming in contact with the other of the relay terminal or the second counterpart terminal.

3. The connection device according to claim 1, wherein the first counterpart terminal configures a first connector to be provided in a first device, and
the second counterpart terminal configures a second connector to be provided in a second device different from the first device.

4. The connection device according to claim 2, wherein the first counterpart terminal configures a first connector to be provided in a first device, and
the second counterpart terminal configures a second connector to be provided in a second device different from the first device.

* * * * *